(12) United States Patent
Pal

(10) Patent No.: US 9,855,903 B1
(45) Date of Patent: Jan. 2, 2018

(54) ELECTRICAL CONTACTOR AND PANEL ASSEMBLIES

(71) Applicant: Hamilton Sundstrand Corporation, Charlotte, NC (US)

(72) Inventor: Debabrata Pal, Hoffman Estates, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 15/207,197

(22) Filed: Jul. 11, 2016

(51) Int. Cl.
| | | |
|---|---|---|
| H05K 7/20 | (2006.01) | |
| H02B 1/04 | (2006.01) | |
| H02B 1/20 | (2006.01) | |
| H01R 13/00 | (2006.01) | |
| B60R 16/03 | (2006.01) | |
| H02B 1/56 | (2006.01) | |
| H01B 3/02 | (2006.01) | |
| H02G 3/08 | (2006.01) | |
| H02G 5/00 | (2006.01) | |
| H02B 1/052 | (2006.01) | |

(52) U.S. Cl.
CPC .............. *B60R 16/03* (2013.01); *H01B 3/02* (2013.01); *H02B 1/052* (2013.01); *H02B 1/56* (2013.01); *H02G 3/081* (2013.01); *H02G 5/00* (2013.01)

(58) Field of Classification Search
CPC .......... B60R 16/03; H02B 1/56; H02B 1/052; H01B 3/02; H02G 3/081; H02G 5/00

USPC .................. 361/636, 637, 709, 712; 439/485
See application file for complete search history.

(56) References Cited

U.S. PATENT DOCUMENTS

| | | | |
|---|---|---|---|
| 5,172,213 A | 12/1992 | Zimmerman | |
| 5,337,214 A | 8/1994 | Lindsey et al. | |
| 6,522,542 B1 | 2/2003 | Gordon et al. | |
| 7,834,447 B2 | 11/2010 | Karavakis et al. | |
| 7,837,496 B1* | 11/2010 | Pal ....................... | H01R 9/2466 361/712 |
| 9,137,925 B2 | 9/2015 | Pal et al. | |
| 9,142,364 B2 | 9/2015 | Pal | |
| 9,153,946 B2 | 10/2015 | Pal | |
| 2003/0206399 A1 | 11/2003 | Chung et al. | |
| 2014/0002995 A1* | 1/2014 | Pal ......................... | H01H 1/62 361/712 |
| 2014/0087584 A1* | 3/2014 | Pal ......................... | H02B 1/056 439/485 |
| 2016/0028216 A1 | 1/2016 | Pal | |

* cited by examiner

*Primary Examiner* — Sherman Ng
(74) *Attorney, Agent, or Firm* — Locke Lord LLP; Scott D. Wofsy; Christopher J. Cillié

(57) ABSTRACT

An electrical contactor assembly includes an electrical contactor, a post in electrical communication with the electrical contactor, an insulator body, and a heat sink. The insulator body is in intimate mechanical contact with the post. The heat sink is in intimate mechanical contact with the insulator body and is in thermal communication with the electrical contactor through the post and the insulator body such that heat flowing between contactor and the heat sink flows through the post and the insulator body.

16 Claims, 4 Drawing Sheets

ELECTRICAL CONTACTOR AND PANEL ASSEMBLIES

BACKGROUND OF THE INVENTION

1. Field of the Invention

The present disclosure relates to electrical power distribution systems, and more particularly to mounting arrangements for contactors in power distribution systems.

2. Description of Related Art

Contactors are commonly used in electrical systems, such as aircraft power distribution systems, to control current flow through the electrical system. Contactors are typically mounted within power distribution panels in mounting arrangements. The mounting arrangements are generally constructed from thermally and electrically resistive materials, such as plastics, which provide support and electrically connectivity to power sources and power-consuming devices.

Contactors generally connect to an electrical bus bar such that current flows through the contactor when the contactor is in a closed position. Flow is typically initiated by mechanically actuating a contact plate within the contactor that, when pushed into electrical contact with two leads, forms an electrical path coupling the leads and allows current to flow through the contactor. Current flowing through the leads and contactor generates heat through resistive heating of current-carrying component of the electrical path, which is typically removed in order to prevent heat buildup. In some electrical systems, the contactor mounting arrangement employs a thermally conductive electrical connection that allow heat to flow from the contact to external environment through the bus bar connected to the contactor leads.

Such conventional methods and systems have generally been considered satisfactory for their intended purpose. However, there is still a need in the art for improved contactor mounting arrangements. The present disclosure provides a solution for this need.

SUMMARY OF THE INVENTION

An electrical contactor assembly includes an electrical contactor, a post in electrical communication with the electrical contactor, an insulator body, and a heat sink. The insulator body is in intimate mechanical contact with the post. The heat sink is in intimate mechanical contact with the insulator body and is in thermal communication with the electrical contactor through the post and the insulator body such that heat flowing between contactor and the heat sink flows through the post and the insulator body.

In certain embodiments, the electrical contactor assembly can include a lead. The lead can be in intimate mechanical contact with an axial face of the post. The electrical contactor assembly can include a panel. The heat sink can be fixed to the panel. A fastener can extend through the heat sink and the panel to fix the heat sink the panel. A post sleeve can be seated in the panel. The heat sink can be fixed to the post sleeve. A fastener extending through the heat sink and the post sleeve can fix the heat sink to the post sleeve. The electrical contactor assembly can include a bus bar. The bus bar can be disposed on a side of the panel opposite the electrical contactor. The bus bar can be in electrical communication with the electrical contactor through the post.

It is also contemplated that, in accordance with certain embodiments, the insulator body can have first and second opposed surfaces. The first surface can be compressively fixed against the lateral surface of the post. The second surface can be compressively fixed against a surface of the heat sink. The insulator body can define an insulator body axis. The insulator body axis can be parallel to and offset from an axis defined by the post. The insulator body axis can be parallel to and offset from an axis defined by the heat sink. The insulator body can overlay the post sleeve. It is also contemplated that the heat sink can overlay the post sleeve.

In accordance with certain embodiments, the heat sink can include a resilient body. The resilient body can have an unloaded state and a loaded state. In the unloaded state the resilient body can have an arcuate shape. In the unloaded state the resilient body can have a linear shape. The resilient body can compressively fix the insulator body between the heat sink and the post. The heat sink can have an L-shaped profile. A first portion of the L-shaped profile can abut a panel surface. A second portion of the L-shaped profile can abut a surface of the insulting body. The heat sink can be formed from an electrically conductive material with high thermal conductivity, such as aluminum. The insulator body can be formed from an electrically insulative material with high thermal conductivity, such as aluminum nitride. The post sleeve can formed from an electrically resistive material with low thermal conductivity, such as DAP.

An electrical panel box assembly includes an electrical contactor assembly as described above, a bus bar in electrical communication with the electrical contactor through the post, and a panel. The panel separates the bus bar from the electrical contactor. The insulator body has a first surface and an opposed second surface, the first surface of the insulator body being in intimate mechanical contact with the post and the second surface being in intimate mechanical contact with the heat sink. The heat sink has an L-shaped profile that compressively fixes the insulator body between a lateral surface of the post and the heat sink.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
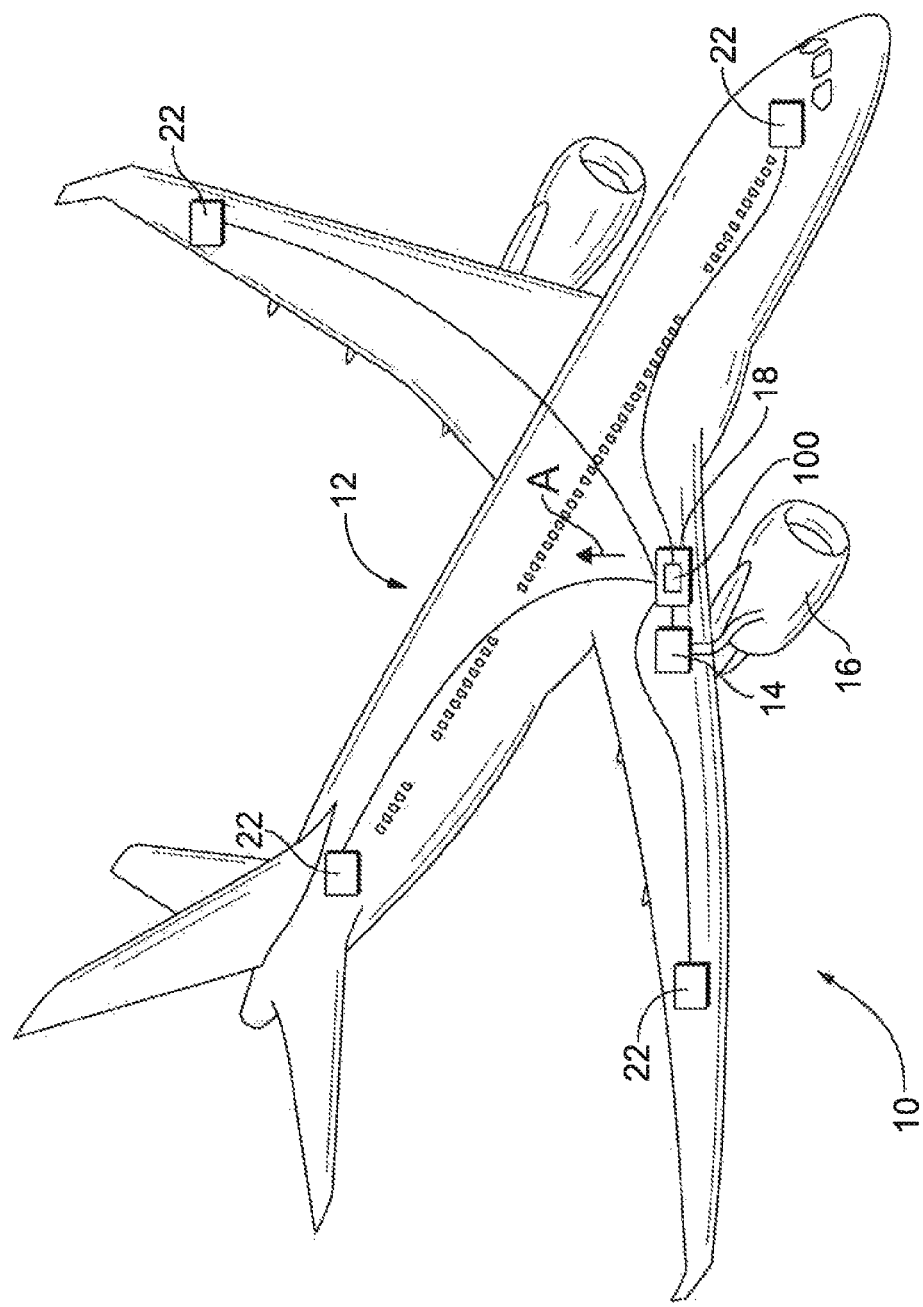
FIG. 1 is a schematic view of an exemplary embodiment of an aircraft electrical system constructed in accordance with the present disclosure, showing an electrical panel box assembly and an electrical contactor assembly.

Reference will now be made to the drawings wherein like reference numerals identify similar structural features or aspects of the subject disclosure. For purposes of explanation and illustration, and not limitation, a partial view of an exemplary embodiment of an electrical contactor assembly in accordance with the disclosure is shown in FIG. 1 and is designated generally by reference character 100. Other embodiments of electrical contactor assemblies, panel box assemblies, and aircraft electrical systems in accordance with the disclosure, or aspects thereof, are provided in FIGS. 2-5, as will be described. The systems and methods described herein can be used removing heat from contactor assemblies, such as in panel boxes in aircraft electrical systems.

Referring now to FIG. 1, an aircraft 10 is shown. Aircraft 10 includes an electrical power distribution system 12. Electrical power distribution system 12 includes a power generation system 14, which uses mechanical rotation of a gas turbine engine 16 to generate either single phase or multi-phase electrical power A. Electrical power A is provided by electrical power distribution system 12 to a panel box assembly 18. Panel box assembly 18 houses bus bars 20 (shown in FIG. 2) and one or more electrical contactor assembly 100. Electrical contactor assembly 100 is configured and adapted for controlling the flow of electrical power and current between power generation system 14 and power consuming devices 22 connected to panel box assembly 18.

Figure 2:
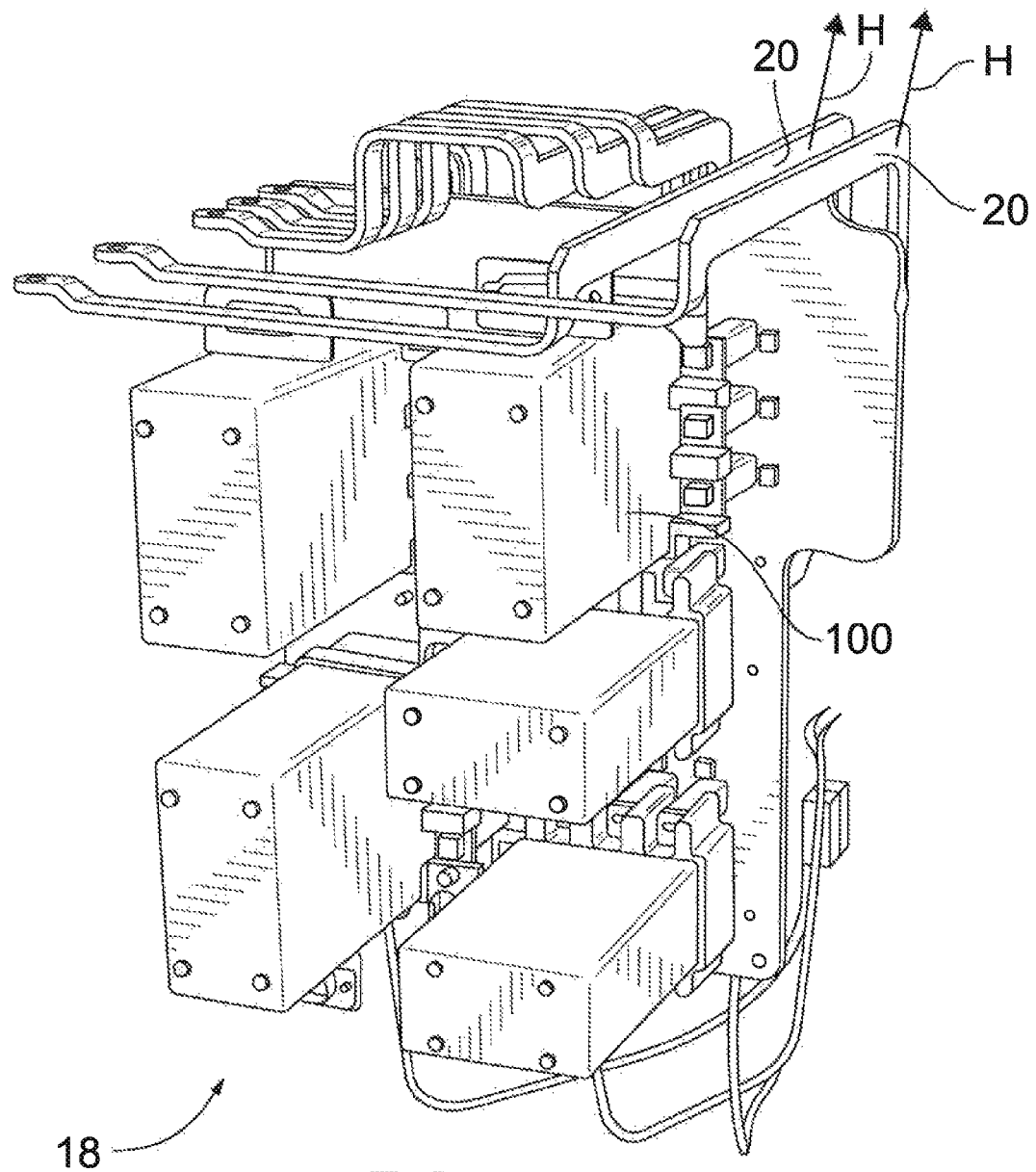
FIG. 2 is a perspective view of the panel box assembly of FIG. 1, showing the electrical contactor assembly in electrical communication with a bus bar.

With reference to FIG. 2, panel box assembly 18 is shown. Panel box assembly 18 includes bus bars 20 and one or more electrical contactor assembly 100. Bus bars 20 are interrupted by the one or more electrical contactor assembly 100, which have an electrically closed state and an electrically open state. When in the open state, no electrical power and current flow through electrical contactor assembly 100. When in the closed state, electrical power and current flow through electrical contactor assembly 100. The flow of electrical power and through electrical contactor assembly 100 generates heat H from resistive heating, which is transmitted to the bus bars 20 for dissipation by natural convection and radiation into the ambient atmosphere.

Figure 3:
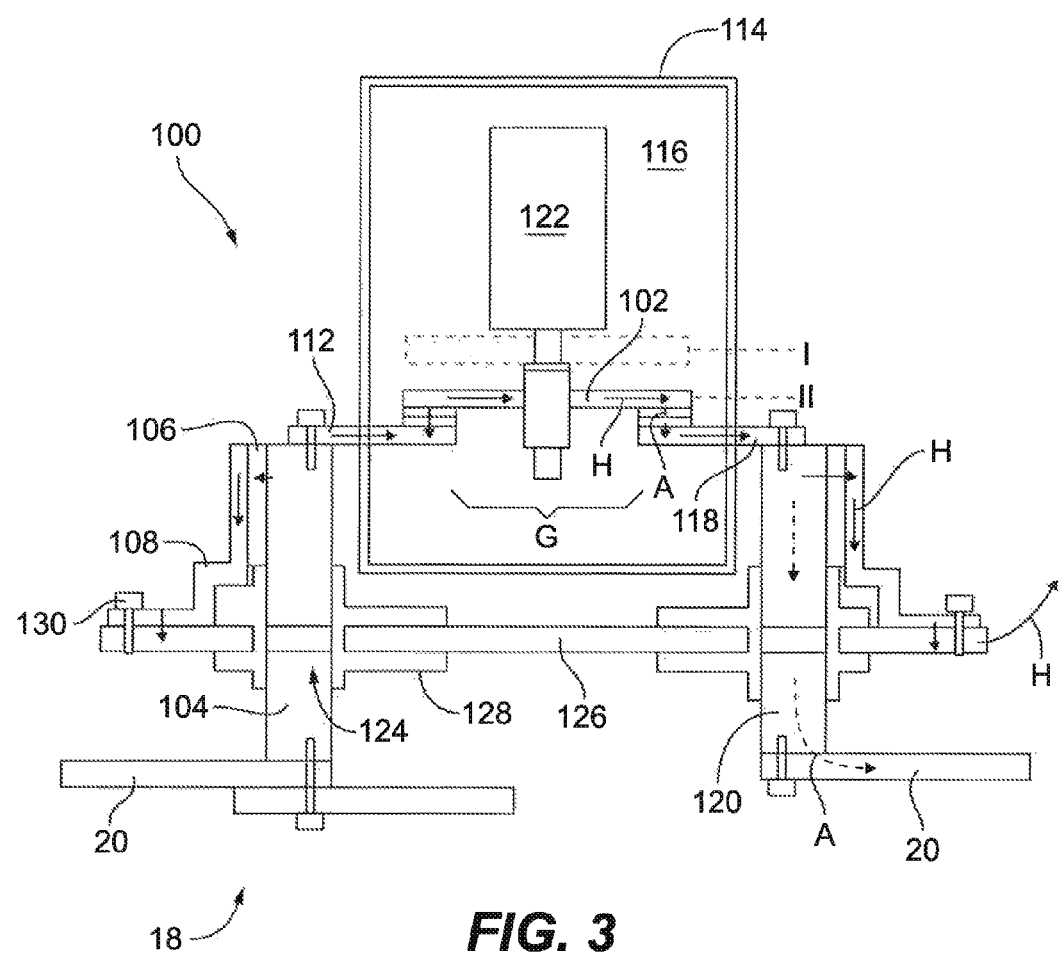
FIG. 3 is a schematic cross-sectional view of the electrical panel box assembly and electrical contactor assembly of FIG. 1, showing current flow and heat flow through components of the electrical panel box assembly and electrical contactor assembly.

With reference to FIG. 3, electrical contactor assembly 100 is shown. Electrical contactor assembly 100 includes an electrical contactor 102, a post 104 in electrical communication with electrical contactor 102, an insulator body 106, and a heat sink 108. Insulator body 106 is in intimate mechanical contact with post 104. Heat sink 108 is in intimate mechanical contact with insulator body 106 and is in thermal communication with electrical contactor 102 through post 104 and insulator body 106 such that heat flowing between electrical contactor 102 and heat sink 108 flows through post 104 and insulator body 106.

Bus bar 20 is in electrical communication with power generation system 14 (shown in FIG. 1) and is connected to post 104. Post 104 is connected to a lead 112. Lead 112 extends through a housing 114 to a location within an interior 116 of housing 114. A lead 118 is separated from lead 112 by a gap G, and extends through housing 116 to a post 120. Post 120 is connected to a bus bar 20, which is in electrical communication with one or more power-consuming device 22 (shown in FIG. 22). Bus bar 20 is disposed on a side of a panel 126 that is opposite electrical contactor 102. Bus bar 20 is in electrical communication with electrical contactor 102 through post 104.

Post 104 extends through an aperture 124 defined by panel 126. A post sleeve 128 is seated within aperture 124, and is formed from an electrical insulating material with low thermal conductivity. It is contemplated that post sleeve 128 can include a material such as diallyl phthalate (DAP) molding compound. Materials such as DAP allow for forming post sleeve 128 as an electrically insulating, thermally conductive structure with complex geometry.

Electrical contactor 102 has an open position I (shown in dashed outline) and a close position II (shown in solid outline). A drive mechanism 122 is operatively connected to electrical contactor 102 and is arranged to move electrical contactor 102 between the open position I and the closed position II. In the open position I, lead 112 is electrically isolated from lead 118, and no electrical power and current flows through electrical contactor 102. In the closed position II, lead 112 is electrical connected to lead 118, and electrical power and current A flows from lead 112, through electrical contactor 102, and into lead 118. As will be appreciated by those of skill in the art in view of the present disclosure, flow of electrical current and power A generates heat H from resistive heating of current-carrying components, e.g., electrical contactor 102, lead 112, lead 118, etc. While a portion of heat H dissipates through bus bar 20 through post 104 and post 120, those of skill in the will recognize that heat sink 108 allows for removal of additional heat from electrical contactor assembly 100, increasing the electrical power and current conveying capability of the electrical contactor assembly 100.

Heat sink 108 is fixed to panel 126. In the illustrated exemplary embodiment, a fastener 130 couples heat sink 108 to panel 126 and fixes heat sink 108 to panel 126. Fastener 130 extends through heat sink 108 and panel 126 to fix heat sink 108 to panel 126. It is contemplated that heat sink 108 can alternatively (or additionally) be fixed to post sleeve 128, such as through a fastener 132 (shown in FIG. 5B). Fastener 132 can extend through heat sink 108 and post sleeve 128 to fix heat sink 108 to panel 126. Fixing heat sink 108 to post sleeve 128 allows panel 126 and post 104 to respond differently to heat flow and geometry of the respective structures while maintain contact with heat sink 108, increasing the range of temperature change that electrical contactor assembly 100 can accommodate and continue to dissipate heat.

Figure 4:
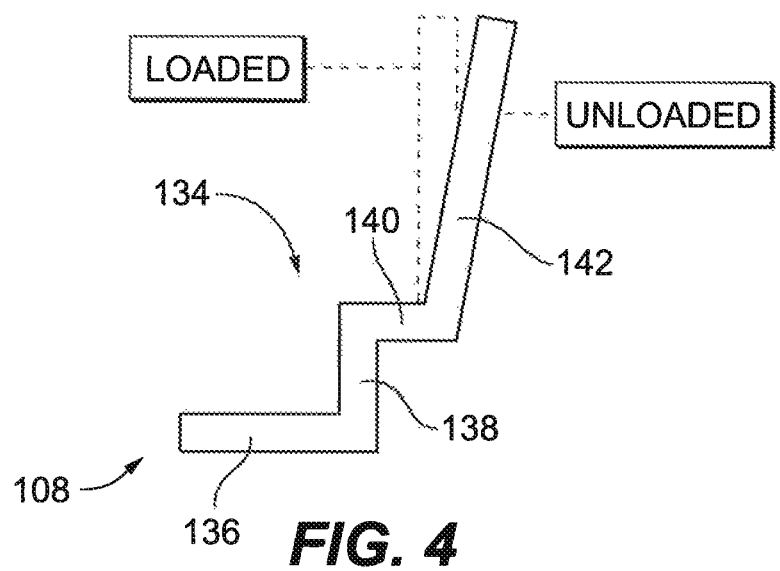
FIG. 4 is a side elevation view of a heat sink of the electrical contactor assembly of FIG. 1, showing a profile of the heat sink in an unloaded state, according to an embodiment.

With reference to FIG. 4, heat sink 108 is shown. Heat sink 108 has a resilient spring body 134 formed from a material with good thermal conductivity. Spring body 134 is arranged with a shape that, when fastened to post sleeve 128 (shown in FIG. 3), compressively fixes insulating body 106 between heat sink 108 and post 104 without requiring seating a fastener between heat sink 108 and post 104. As such heat sink 108 is electrically separated from post 104, and can therefore be constructed from an electrically conductive material, such as aluminum or aluminum alloy, with good thermal conductivity.

In the illustrated exemplary embodiment, spring body 134 is generally L-shaped and has a stepped segment. In this respect resilient body 134 has a first panel-spanning portion 136, a first post-spanning portion 138, a second panel-spanning portion 140, and a second panel-spanning portion 142. First post-spanning portion 138 is coupled at end to second panel-spanning segment 140 to form a step or spring element. First panel-spanning segment 136 is coupled to an end of first post-spanning portion 138 in a cantilevered arrangement. Second post-spanning portion 142 is coupled to an opposite end of second panel-spanning portion 140 in a cantilevered arrangement. The cantilevered arrangement of second post-spanning portion 142 and first panel-spanning portion 136 in relation to first post-spanning portion 138 and second panel-spanning portion 140 enables using the resilience of the shape to compressively fix insulator body 106 between second post-spanning portion 142 and post 104.

Figure 5:
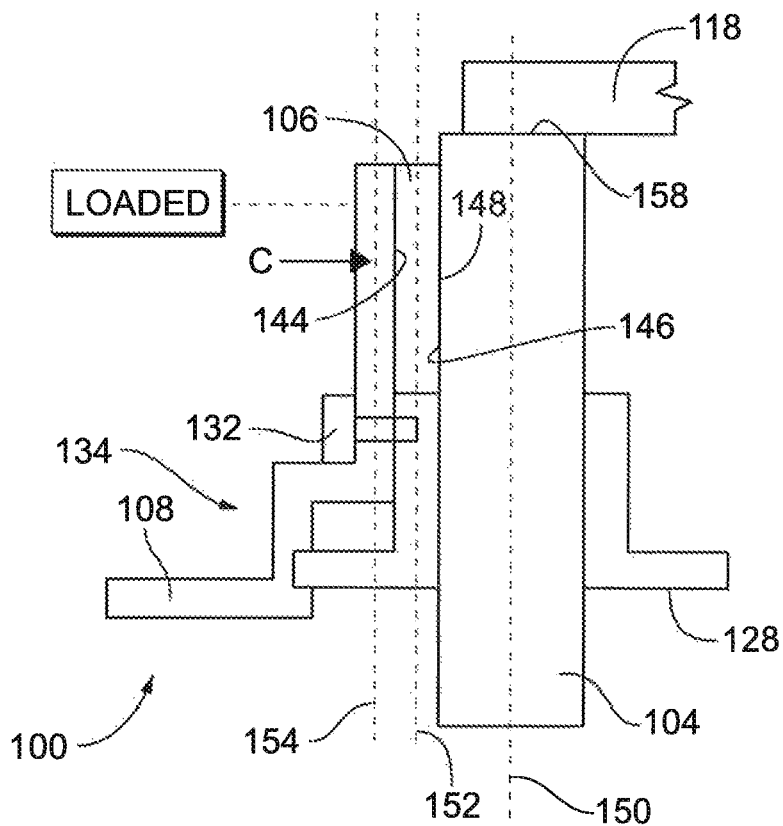
FIG. 5 is a side elevation view of the heat sink of the electrical contactor assembly of FIG. 4, showing a profile of the heat sink in a loaded state, according to the embodiment

As also shown in FIG. 4, spring body 134 has an unloaded shape (shown in solid outline) and a loaded shape (shown in dashed outline). In the unloaded state, second post-spanning portion 142 is angled relative first panel-spanning segment 136 at an angle which is different than an angle defined between post 104 and panel 126. As a consequence, when coupled between post 104 and panel 126 (as shown in FIG. 5), spring body 134 conforms to the angle defined between post 104 and panel 126. Conforming spring body 134 to the angle defined between post 104 and panel 126 causes spring body 134 to adopt a loaded state, thereby exerting a compressive force C against insulator body 106 and directed toward post 104. As will be appreciated by those of skill in the art in view of the present disclosure, the stepped L-shaped profile of resilient body 134 increases the area of fastener 132 (shown in FIG. 5) that contacts heat sink 108, commensurately reducing the size fastener 132. It also allows heat sink 108 to span post sleeve 128, which may be relative complex due to the need to fix post 104 relative to panel 126.

Heat sink 108 has an unloaded state (shown in FIG. 4) and a loaded state (shown in FIG. 5). In the unloaded state, a portion of heat sink 108 deviates from the corresponding portion of insulator body 108 to which the portion engages when assembled, for example with the arcuate profile defined by second post-spanning portion 142. In the illustrated exemplary embodiment, second post-spanning portion 142 has an arcing profile that, upon engagement to insulator body 106, adopts a linear shape (as shown in FIG. 5).

With reference to FIG. 5, heat sink 108 is shown in a loaded state. Upon installation, first panel-spanning portion 136 abuts a surface of panel 126 (shown in FIG. 3) and second post-spanning portion 142 abuts a surface of insulator body 106 (shown in FIG. 3). Since panel 126 and post 104 are angled relative to one another differently than first panel-spanning portion 136 and second post-spanning portion 142, fastening heat sink 108 with fastener 132 (shown in FIG. 3) to sleeve 128 deforms heat sink 108 and causes heat sink 108 to exert compressive force C against insulator body 106 and towards post 104. Compressive force C fixes insulator body 106 between heat sink 108 and post 104 without directly fastening heat sink 108 against post 104, simplifying the fabrication of electrical contactor assembly 100. The stepped arrangement of first post-spanning portion 138 and second panel-spanning portion 140 also allow heat sink 108 to dog-leg over sleeve 128, thereby accommodating the shape of sleeve 128 and providing a relatively compact arrangement.

In the loaded state, heat sink 108 exerts the compressive force C against insulator body 106. Compressive force C fixes insulator body 106 between heat sink 108 and post 104. In this respect insulator body 106 has a first surface 144 and an opposed second surface 146. First surface 144 is intimate mechanical contact with heat sink 108 and receives compressive force C. Second surface 146 is in intimate mechanical contact with post 104. In the illustrated arrangement, second surface 146 of insulator body 106 is in intimate mechanical contact with a lateral surface 148 of post 104. It is contemplated that insulator body 106 include an electrically resistive and thermally conductive material, such as aluminum nitride, such that heat flows readily between post 104 and heat sink 108, thereby facilitating heat removal from electrical contactor 102.

Post 104 defines a post axis 150. Insulator body 106 defines an insulator body axis 152. Heat sink 108 defines a heat sink axis 154. Insulator body axis 152 is parallel to post axis 150 and is laterally offset therefrom. Heat sink axis 154 is parallel to insulator body axis 152 and is laterally offset therefrom on a side of insulator body 106 opposite post 104. Because insulator body axis 152 is laterally offset from post axis 150, lead 118 can be in intimate mechanical contact with an axial face 156 of post 104. This reduces the number of interfaces between lead 118 and post 104, improving heat flow between lead 118 and post 104.

Power panel assemblies are typically cooled by natural convection and/or radiation. In some power assemblies the contactor can be the thermally limiting components on the power panel assembly. For example, the heat removal capability provided by some electrical contactor mounting arrangements can dictate that the electrical contactor be operated at below its rated capability, for example, a contactor rated at 260 amps can be used at a 220 amps application. In such applications, heat sinks are typically used to provide supplemental heat sinking in lieu of contractors rated at more than 260 amps—which are generally more massive in size.

One challenge to supplemental heat sinking is that, due to component stack ups and multiple electrical and thermal interfaces of some supplemental heat sinking arrangements, the benefit of the additional heat transfer capability can be offset by the cost, weight, and fastening complexity. In embodiments described herein, heat sink 108 in thermal communication with post 104 through insulator body 106 such that heat flows from post 104 to heat sink 108 through insulator body 106. In certain embodiments, heat sink 108 has an L-shape and is fastened to post sleeve 128. In accordance with certain embodiments, heat sink 108 can have an unloaded state, wherein it is slightly bent, such that when installed heat sink 108 exerts a compressive force on the insulator body. This increases the heat transfer from electrical contactor 102, reducing the operating temperature of electrical contactor 102 for a given current flow.

The methods and systems of the present disclosure, as described above and shown in the drawings, provide for contactor assemblies and panel assemblies with superior properties including a relatively small number of interfaces in the thermal conduction path to the heat sink, corresponding reduction in stack up issues and associated thermal issues, and/or simplification of the electrical contactor mounting. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. An electrical contactor assembly, comprising:
   an electrical contactor;
   a post in electrical communication with the electrical contactor;

an insulator body in intimate mechanical contact with the post; and a heat sink in intimate mechanical contact with the insulator body, wherein the heat sink is in thermal communication with the electrical contactor through the post and the insulator body such that heat flowing between contactor and the heat sink flows through the post and the insulator body, wherein the heat sink comprises a resilient body, wherein the resilient body compressively fixes the insulator body between the heat sink and the post.

2. The electrical contactor assembly as recited in claim 1, wherein the insulator body is in intimate mechanical contact with a lateral surface of the post.

3. The electrical contactor assembly as recited in claim 1, wherein the electrical contactor comprises a lead, wherein the lead is in intimate mechanical contact with an axial face of the post.

4. The electrical contactor assembly as recited in claim 1, wherein the heat sink has an L-shaped profile.

5. The electrical contactor assembly as recited in claim 1, wherein the insulator body comprises aluminum nitride.

6. The electrical contactor assembly as recited in claim 1, wherein the heat sink defines a heat sink axis, wherein the insulator body defines an insulator body axis, the insulator body axis being parallel to and offset from the heat sink axis.

7. The electrical contactor assembly as recited in claim 1, wherein the insulator body defines an insulator body axis, wherein the post defines a post axis, the post axis being parallel to and offset from the insulator body axis.

8. The electrical contactor assembly as recited in claim 1, further comprising a post sleeve, wherein the post extends through the post sleeve and the heat sink is fixed to the post sleeve.

9. The electrical contactor assembly as recited in claim 1, wherein the post sleeve comprises an electrically insulator with low thermal conductivity.

10. The electrical contactor assembly as recited in claim 8, further comprising a fastener coupling the heat sink to the post sleeve.

11. The electrical contactor assembly as recited in claim 1, further comprising a panel, wherein the post extends through the panel and the heat sink is fixed to the panel.

12. The electrical contactor assembly as recited in claim 10, further comprising a fastener coupling the heat sink to the post sleeve.

13. The electrical contactor assembly as recited in claim 1, further comprising a bus bar in electrical communication with the contactor through the post.

14. An electrical panel box assembly comprising:

an electrical contactor assembly as recited in claim 1;

a bus bar electrically connected to the electrical contactor by the post; and a panel separating the bus bar from the electrical contactor, wherein the insulator body is in intimate mechanical contact with a lateral surface of the post, wherein the electrical contactor is in intimate mechanical contact with an axial face of the post, and wherein the heat sink has an L-shaped profile compressively fixing the insulator body between the lateral surface of the heat sink and the post.

15. The electrical panel box assembly as recited in claim 14, wherein the heat sink defines a heat sink axis, the insulator body defines an insulator body axis, and the insulator body axis being parallel to and offset from the heat sink axis; wherein the post defines a post axis, the post axis being parallel to and offset from the insulator body axis.

16. The electrical panel box assembly as recited in claim 14, further comprising a post sleeve seated in the panel, wherein the post extends through the post sleeve, a first fastener couples the heat sink to the post sleeve, and a second fastener couples the heat sink to the panel.

* * * * *